(12) United States Patent
Baker (10) Patent No.: US 6,823,493 B2
(45) Date of Patent: Nov. 23, 2004

(54) WORD RECOGNITION CONSISTENCY CHECK AND ERROR CORRECTION SYSTEM AND METHOD

(75) Inventor: James K. Baker, Maitland, FL (US)

(73) Assignee: Aurilab, LLC, Maitland, FL (US)

( * ) Notice: Subject to any disclaimer, the term of this patent is extended or adjusted under 35 U.S.C. 154(b) by 56 days.

(21) Appl. No.: 10/348,780

(22) Filed: Jan. 23, 2003

(65) Prior Publication Data

US 2004/0148284 A1 Jul. 29, 2004

(51) Int. Cl.$^7$ ............................................. G06F 17/00
(52) U.S. Cl. ...................... 715/530; 715/532; 704/254; 704/252
(58) Field of Search .................................. 715/530, 532; 704/254, 252, 251, 257, 216, 217, 236, 237, 239

(56) References Cited

U.S. PATENT DOCUMENTS

| | | | |
|---|---|---|---|
| 4,748,670 A | | 5/1988 | Bahl et al. |
| 4,783,803 A | | 11/1988 | Baker et al. |
| 4,803,729 A | | 2/1989 | Baker |
| 4,866,778 A | | 9/1989 | Baker |
| 4,882,757 A | * | 11/1989 | Fisher et al. ................ 704/253 |
| 5,027,406 A | | 6/1991 | Roberts et al. |
| 5,222,190 A | | 6/1993 | Pawate et al. |
| 5,241,619 A | | 8/1993 | Schwartz et al. |
| 5,822,730 A | | 10/1998 | Roth et al. |
| 5,920,837 A | | 7/1999 | Gould et al. |
| 5,970,450 A | * | 10/1999 | Hattori ........................ 704/239 |
| 5,970,460 A | * | 10/1999 | Bunce et al. ................ 704/278 |
| 6,073,097 A | | 6/2000 | Gould et al. |
| 6,088,669 A | | 7/2000 | Maes |
| 6,122,613 A | | 9/2000 | Baker |
| 6,249,763 B1 | * | 6/2001 | Minematsu ................. 704/252 |
| 6,253,178 B1 | | 6/2001 | Robillard et al. |
| 6,260,013 B1 | | 7/2001 | Sejnoha |
| 6,289,513 B1 | * | 9/2001 | Bentwich .................... 717/106 |
| 6,308,152 B1 | * | 10/2001 | Konuma et al. ............ 704/238 |
| 6,374,210 B1 | * | 4/2002 | Chu ............................... 704/9 |
| 6,725,196 B2 | * | 4/2004 | Keiller et al. ............... 704/242 |

OTHER PUBLICATIONS

X. Huang, "Spoken language processing: a guide to theory, algorithm, and system development", 2001, pp. 383–401 and pp. 622–639.

F. Jelinek, "Statistical methods for speech recognition", 1997, chapter 5, pp. 80–103.

* cited by examiner

*Primary Examiner*—Sanjiv Shah
(74) *Attorney, Agent, or Firm*—Foley & Lardner, LLP (57) ABSTRACT

A word recognition method and system includes obtaining a first portion of a sentence and a second portion of the sentence. The first portion of the sentence is used to obtain a pointer to respective list of second portions of sentences that are complementary to the first portion of the sentence. A match is determined to one of the second portions of sentences from the list based on information obtained from the second portion of the sentence. An error correction capability for dealing with one word errors in the sentence for checking against the database is also attainable.

36 Claims, 4 Drawing Sheets

WORD RECOGNITION CONSISTENCY CHECK AND ERROR CORRECTION SYSTEM AND METHOD

FIELD OF THE INVENTION

The invention relates to a system and method for checking a combination of partial sentences that make up a sentence, with a database that contains a plurality of acceptable sentences.

BACKGROUND OF THE INVENTION

For checking a received entry against a database that contains a plurality of valid entries, it is desirable that the checking be done in a fast and accurate manner. It is also desirable to provide an error checking capability as well.

SUMMARY OF THE INVENTION

According to one embodiment of the invention, there is provided a word recognition method, which includes receiving a first portion of a sentence, and receiving a second portion of the sentence. The method also includes using the first portion of the sentence to obtain a pointer to respective list of second portions of sentences that are complementary to the first portion of the sentence in a database of sentences. The method further includes determining whether there is a match of the first portion of the sentence and the second portion of the sentence based on information obtained from the list of second portions of sentences that are complementary to the first portion of the sentence.

According to another embodiment of the invention, there is provided a word recognition method, which includes receiving a first portion of a sentence, and receiving a second portion of the sentence. The method also includes determining an entry in at least one of a first table associated with the first portion that is recognized of the sentence, or a second table that is associated with the second portion that is recognized of the sentence. The method further includes selecting either the first table or the second table based on the entry. If the selected table has not had an entry determined therefor, then determining an entry in the selected table. The method still further includes determining, based on the entry in the selected table, a list of second portions of sentences that are complementary to the first portion that is recognized of the sentence. The method also includes determining a match to one of the second portions in the list of second portions that are complementary based on information regarding the second portion.

According to yet another embodiment of the invention, there is provided a word recognition system for comparing an input sentence against a plurality of sentences stored in a database, which includes a first input unit for inputting a first portion of the input sentence, and a second input unit for inputting a second portion of the input sentence. The system also includes a first hash computation unit for determining a first hash value corresponding to the first portion of the input sentence. The system further includes a second hash computation unit for determining a second hash value corresponding to the second portion of the input sentence. The system still further includes a hash code conflict resolution unit for comparing the second hash value against a list of hash values corresponding to complementary second portions of the sentence that occur together with the first portion of the sentence in at least one entry in a database, and for outputting a database consistency signal when at least one match is found.

According to yet another embodiment of the invention, the list of hash values corresponding to the complementary second portions of sentences correspond to respective entries in the database of sentences that are missing one word that occurs after an end of the first portion of sentence. With this feature, corrections can be made of an error in the one word due to a speaker speaking an incorrect sentence. Alternatively, with this feature, corrections can be made of an error in the database for a sentence whereby the one word in the sentence is the error.

DETAILED DESCRIPTION OF THE INVENTION

The invention is described below with reference to drawings. These drawings illustrate certain details of specific embodiments that implement the systems and methods and programs of the present invention. However, describing the invention with drawings should not be construed as imposing, on the invention, any limitations that may be present in the drawings. The present invention contemplates methods, systems and program products on any computer readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising computer-readable media for carrying or having computer-executable instructions or data structures stored thereon. Such computer-readable media can be any available media which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above are also be included within the scope of computer-readable media. Computer-executable instructions comprise, for example, instructions and data which cause a general purpose computer, special purpose computer, or special purpose processing device to perform a certain function or group of functions.

The invention will be described in the general context of method steps which may be implemented in one embodiment by a program product including computer-executable instructions, such as program code, executed by computers in networked environments. Generally, program code include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, main frame computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

The following terms may be used in the description of the invention and include new terms and terms that are given special meanings. "Linguistic element" is a unit of written or spoken language.

"Speech element" is an interval of speech with an associated name. The name may be the word, syllable or phoneme being spoken during the interval of speech, or may be an abstract symbol such as an automatically generated phonetic symbol that represents the system's labeling of the sound that is heard during the speech interval.

"Priority queue" in a search system is a list (the queue) of hypotheses rank ordered by some criterion (the priority). In a speech recognition search, each hypothesis is a sequence of speech elements or a combination of such sequences for different portions of the total interval of speech being analyzed. The priority criterion may be a score which estimates how well the hypothesis matches a set of observations, or it may be an estimate of the time at which the sequence of speech elements begins or ends, or any other measurable property of each hypothesis that is useful in guiding the search through the space of possible hypotheses.

A priority queue may be used by a stack decoder or by a branch-and-bound type search system. A search based on a priority queue typically will choose one or more hypotheses, from among those on the queue, to be extended. Typically each chosen hypothesis will be extended by one speech element. Depending on the priority criterion, a priority queue can implement either a best-first search or a breadth-first search or an intermediate search strategy.

"Best first search" is a search method in which at each step of the search process one or more of the hypotheses from among those with estimated evaluations at or near the best found so far are chosen for further analysis.

"Breadth-first search" is a search method in which at each step of the search process many hypotheses are extended for further evaluation. A strict breadth-first search would always extend all shorter hypotheses before extending any longer hypotheses. In speech recognition whether one hypothesis is "shorter" than another (for determining the order of evaluation in a breadth-first search) is often determined by the estimated ending time of each hypothesis in the acoustic observation sequence. The frame-synchronous beam search is a form of breadth-first search, as is the multi-stack decoder.

"Frame" for purposes of this invention is a fixed or variable unit of time which is the shortest time unit analyzed by a given system or subsystem. A frame may be a fixed unit, such as 10 milliseconds in a system which performs spectral signal processing once every 10 milliseconds, or it may be a data dependent variable unit such as an estimated pitch period or the interval that a phoneme recognizer has associated with a particular recognized phoneme or phonetic segment. Note that, contrary to prior art systems, the use of the word "frame" does not imply that the time unit is a fixed interval or that the same frames are used in all subsystems of a given system.

"Frame synchronous beam search" is a search method which proceeds frame-by-frame. Each active hypothesis is evaluated for a particular frame before proceeding to the next frame. The frames may be processed either forwards in time or backwards. Periodically, usually once per frame, the evaluated hypotheses are compared with some acceptance criterion. Only those hypotheses with evaluations better than some threshold are keep active. The beam consists of the set of active hypotheses.

"Stack decoder" is a search system that uses a priority queue. A stack decoder may be used to implement a best first search. The term stack decoder also refers to a system implemented with multiple priority queues, such as a multi-stack decoder with a separate priority queue for each frame, based on the estimated ending frame of each hypothesis. Such a multi-stack decoder is equivalent to a stack decoder with a single priority queue in which the priority queue is sorted first by ending time of each hypothesis and then sorted by score only as a tie-breaker for hypotheses that end at the same time. Thus a stack decoder may implement either a best first search or a search that is more nearly breadth first and that is similar to the frame synchronous beam search.

"Branch and bound search" is a class of search algorithms based on the branch and bound algorithm. In the branch and bound algorithm the hypotheses are organized as a tree. For each branch at each branch point, a bound is computed for the best score on the subtree of paths that use that branch. That bound is compared with a best score that has already been found for some path not in the subtree from that branch. If the other path is already better than the bound for the subtree, then the subtree may be dropped from further consideration. A branch and bound algorithm may be used to do an admissible A* search. More generally, a branch and bound type algorithm might use an approximate bound rather than a guaranteed bound, in which case the branch and bound algorithm would not be admissible. In fact for practical reasons, it is usually necessary to a non-admissible bound just as it is usually necessary to do beam pruning. One implementation of a branch and bound search of the tree of possible sentences uses a priority queue and thus is equivalent to a type of stack decoder, using the bounds as look-ahead scores.

"Admissible A* search." The term A* search is used not just in speech recognition but also to searches in a broader range of tasks in artificial intelligence and computer science. The A* search algorithm is a form of best first search that generally includes a look-ahead term that is either an estimate or a bound on the score portion of the data that has not yet been scored. Thus the A* algorithm is a form of priority queue search. If the look-ahead term is a rigorous bound (making the procedure "admissible"), then once the A* algorithm has found a complete path, it is guaranteed to be the best path. Thus an admissible A* algorithm is an instance of the branch and bound algorithm.

"Score" is a numerical evaluation of how well a given hypothesis matches some set of observations. Depending on the conventions in a particular implementation, better matches might be represented by higher scores (such as with probabilities or logarithms of probabilities) or by lower scores (such as with negative log probabilities or spectral distances). Scores may be either positive or negative. The score may also include a measure of the relative likelihood of the sequence of linguistic elements associated with the given hypothesis, such as the a priori probability of the word sequence in a sentence.

"Dynamic programming match scoring" is a process of computing the degree of match between a network or a sequence of models and a sequence of acoustic observations by using dynamic programming. The dynamic programming match process may also be used to match or time-align two sequences of acoustic observations or to match two models or networks. The dynamic programming computation can be used for example to find the best scoring path through a network or to find the sum of the probabilities of all the paths through the network. The prior usage of the term "dynamic programming" varies. It is sometimes used specifically to mean a "best path match" but its usage for purposes of this patent covers the broader class of related computational methods, including "best path match," "sum of paths" match and approximations thereto. A time alignment, of the model to the sequence of acoustic observations is generally available as a side effect of the dynamic programming computation of the match score. Dynamic programming may also be used to compute the degree of match between two models or networks (rather than between a model and a sequence of observations). Given a distance measure that is not based on a set of models, such as spectral distance, dynamic programming may also be used to match and directly time-align two instances of speech elements.

"Best path match" is a process of computing the match between a network and a sequence of acoustic observations in which, at each node at each point in the acoustic sequence, the cumulative score for the node is based on choosing the best path for getting to that node at that point in the acoustic sequence. In some examples, the best path scores are computed by a version of dynamic programming sometimes called the Viterbi algorithm from its use in decoding convolutional codes. It may also be called the Dykstra algorithm or the Bellman algorithm from independent earlier work on the general best scoring path problem.

"Sum of paths match" is a process of computing a match between a network or a sequence of models and a sequence of acoustic observations in which, at each node at each point in the acoustic sequence, the cumulative score for the node is based on adding the probabilities of all the paths that lead to that node at that point in the acoustic sequence. The sum of paths scores in some examples may be computed by a dynamic programming computation that is sometimes called the forward-backward algorithm (actually, only the forward pass is needed for computing the match score) because it is used as the forward pass in training hidden Markov models with the Baum-Welch algorithm.

"Hypothesis" is a hypothetical proposition partially or completely specifying the values for some set of speech elements. Thus, a hypothesis is typically a sequence or a combination of sequences of speech elements. Corresponding to any hypothesis is a sequence of models that represent the speech elements. Thus, a match score for any hypothesis against a given set of acoustic observations, in some embodiments, is actually a match score for the concatenation of the models for the speech elements in the hypothesis.

"Look-ahead" is the use of information from a new interval of speech that has not yet been explicitly included in the evaluation of a hypothesis. Such information is available during a search process if the search process is delayed relative to the speech signal or in later passes of multi-pass recognition. Look-ahead information can be used, for example, to better estimate how well the continuations of a particular hypothesis are expected to match against the observations in the new interval of speech. Look-ahead information may be used for at least two distinct purposes. One use of look-ahead information is for making a better comparison between hypotheses in deciding whether to prune the poorer scoring hypothesis. For this purpose, the hypotheses being compared might be of the same length and this form of look-ahead information could even be used in a frame-synchronous, beam search. A different use of look-ahead information is for making a better comparison between hypotheses in sorting a priority queue. When the two hypotheses are of different length (that is, they have been matched against a different number of acoustic observations), the look-ahead information is also referred to as missing piece evaluation since it estimates the score for the interval of acoustic observations that have not been matched for the shorter hypothesis.

"Missing piece evaluation" is an estimate of the match score that the best continuation of a particular hypothesis is expected to achieve on an interval of acoustic observations that was yet not matched in the interval of acoustic observations that have been matched against the hypothesis itself. For admissible A* algorithms or branch and bound algorithms, a bound on the best possible score on the unmatched interval may be used rather than an estimate of the expected score.

"Sentence" is an interval of speech or a sequence of speech elements that is treated as a complete unit for search or hypothesis evaluation. Generally, the speech will be broken into sentence length units using an acoustic criterion such as an interval of silence. However, a sentence may contain internal intervals of silence and, on the other hand, the speech may be broken into sentence units due to grammatical criteria even when there is no interval of silence. The term sentence is also used to refer to the complete unit for search or hypothesis evaluation in situations in which the speech may not have the grammatical form of a sentence, such as a database entry, or in which a system is analyzing as a complete unit an element, such as a phrase, that is shorter than a conventional sentence.

"Phoneme" is a single unit of sound in spoken language, roughly corresponding to a letter in written language.

"Phonetic label" is the label generated by a speech recognition system indicating the recognition system's choice as to the sound occurring during a particular speech interval. Often the alphabet of potential phonetic labels is chosen to be the same as the alphabet of phonemes, but there is no requirement that they be the same. Some systems may distinguish between phonemes or phonemic labels on the one hand and phones or phonetic labels on the other hand. Strictly speaking, a phoneme is a linguistic abstraction. The sound labels that represent how a word is supposed to be pronounced, such as those taken from a dictionary, are phonemic labels. The sound labels that represent how a particular instance of a word is spoken by a particular speaker are phonetic labels. The two concepts, however, are intermixed and some systems make no distinction between them.

"Spotting" is the process of detecting an instance of a speech element or sequence of speech elements by directly detecting an instance of a good match between the model(s) for the speech element(s) and the acoustic observations in an interval of speech without necessarily first recognizing one or more of the adjacent speech elements.

"Pruning" is the act of making one or more active hypotheses inactive based on the evaluation of the hypotheses. Pruning may be based on either the absolute evaluation of a hypothesis or on the relative evaluation of the hypothesis compared to the evaluation of some other hypothesis.

"Pruning threshold" is a numerical criterion for making decisions of which hypotheses to prune among a specific set of hypotheses.

"Pruning margin" is a numerical difference that may be used to set a pruning threshold. For example, the pruning threshold may be set to prune all hypotheses in a specified set that are evaluated as worse than a particular hypothesis by more than the pruning margin. The best hypothesis in the specified set that has been found so far at a particular stage of the analysis or search may be used as the particular hypothesis on which to base the pruning margin.

"Beam width" is the pruning margin in a beam search system. In a beam search, the beam width or pruning margin often sets the pruning threshold relative to the best scoring active hypothesis as evaluated in the previous frame.

"Best found so far" Pruning and search decisions may be based on the best hypothesis found so far. This phrase refers to the hypothesis that has the best evaluation that has been found so far at a particular point in the recognition process. In a priority queue search, for example, decisions may be made relative to the best hypothesis that has been found so far even though it is possible that a better hypothesis will be found later in the recognition process. For pruning purposes, hypotheses are usually compared with other hypotheses that have been evaluated on the same number of frames or, perhaps, to the previous or following frame. In sorting a priority queue, however, it is often necessary to compare hypotheses that have been evaluated on different numbers of frames. In this case, in deciding which of two hypotheses is better, it is necessary to take account of the difference in frames that have been evaluated, for example by estimating the match evaluation that is expected on the portion that is different or possibly by normalizing for the number of frames that have been evaluated. Thus, in some systems, the interpretation of best found so far may be based on a score that includes a look-ahead score or a missing piece evaluation.

"Modeling" is the process of evaluating how well a given sequence of speech elements match a given set of observations typically by computing how a set of models for the given speech elements might have generated the given observations. In probability modeling, the evaluation of a hypothesis might be computed by estimating the probability of the given sequence of elements generating the given set of observations in a random process specified by the probability values in the models. Other forms of models, such as neural networks may directly compute match scores without explicitly associating the model with a probability interpretation, or they may empirically estimate an a posteriori probability distribution without representing the associated generative stochastic process.

"Training" is the process of estimating the parameters or sufficient statistics of a model from a set of samples in which the identities of the elements are known or are assumed to be known. In supervised training of acoustic models, a transcript of the sequence of speech elements is known, or the speaker has read from a known script. In unsupervised training, there is no known script or transcript other than that available from unverified recognition. In one form of semi-supervised training, a user may not have explicitly verified a transcript but may have done so implicitly by not making any error corrections when an opportunity to do so was provided.

"Acoustic model" is a model for generating a sequence of acoustic observations, given a sequence of speech elements. The acoustic model, for example, may be a model of a hidden stochastic process. The hidden stochastic process would generate a sequence of speech elements and for each speech element would generate a sequence of zero or more acoustic observations. The acoustic observations may be either (continuous) physical measurements derived from the acoustic waveform, such as amplitude as a function of frequency and time, or may be observations of a discrete finite set of labels, such as produced by a vector quantizer as used in speech compression or the output of a phonetic recognizer. The continuous physical measurements would generally be modeled by some form of parametric probability distribution such as a Gaussian distribution or a mixture of Gaussian distributions. Each Gaussian distribution would be characterized by the mean of each observation measurement and the covariance matrix. If the covariance matrix is assumed to be diagonal, then the multi-variant Gaussian distribution would be characterized by the mean and the variance of each of the observation measurements. The observations from a finite set of labels would generally be modeled as a non-parametric discrete probability distribution. However, other forms of acoustic models could be used. For example, match scores could be computed using neural networks, which might or might not be trained to approximate a posteriori probability estimates. Alternately, spectral distance measurements could be used without an underlying probability model, or fuzzy logic could be used rather than probability estimates.

"Language model" is a model for generating a sequence of speech elements subject to a grammar or to a statistical model for the probability of a particular speech element given the values of zero or more of the speech elements of context for the particular speech element.

"General Language Model" may be either a pure statistical language model, that is, a language model that includes no explicit, grammar, or a grammar-based language model that includes an explicit grammar and may also have a statistical component.

"Grammar" is a formal specification of which word sequences or sentences are legal (or grammatical) word sequences. There are many ways to implement a grammar specification. One way to specify a grammar is by means of a set of rewrite rules of a form familiar to linguistics and to writers of compilers for computer languages. Another way to specify a grammar is as a state-space or network. For each state in the state-space or node in the network, only certain words are allowed to be the next word in the sequence. For each such word, there is a specification (say by a labeled are in the network) as to what the state of the system will be at the end of that next word (say by following the arc to the node at the end of the arc). A third form of grammar representation is as a database of all legal sentences.

"Stochastic grammar" is a grammar that also includes a model of the probability of each legal word sequence.

"Pure statistical language model" is a statistical language model that has no grammatical component. In a pure statistical language model, generally every possible word sequence will have a non-zero probability.

"Entropy" is an information theoretic measure of the amount of information in a probability distribution or the associated random variables. It is generally given by the formula $E=\Sigma_i p_i \log(p_i)$, where the logarithm is taken base 2 and the entropy is measured in bits.

"Perplexity" is a measure of the degree of branchiness of a grammar or language model, including the effect of non-uniform probability distributions. In some embodiments it is 2 raised to the power of the entropy. It is measured in units of active vocabulary size and in a simple grammar in which every word is legal in all contexts and the words are equally likely, the perplexity will be the vocabulary size. When the size of the active vocabulary varies, the perplexity is like a geometric mean rather than an arithmetic mean.

"Decision Tree Question" in a decision tree, is a partition of the set of possible input data to be classified. A binary question partitions the input data into a set and its complement. In a binary decision tree, each node is associated with a binary question.

"Classification Task" in a classification system is a partition of a set of target classes.

"Hash function" is a function that maps a set of objects into the range of integers {0, 1, . . . , N–1}. A hash function in some embodiments is designed to distribute the objects uniformly and apparently randomly across the designated range of integers. The set of objects is often the set of strings or sequences in a given alphabet.

"Lexical retrieval and prefiltering." Lexical retrieval is a process of computing an estimate of which words, or other speech elements, in a vocabulary or list of such elements are likely to match the observations in a speech interval starting at a particular time. Lexical prefiltering comprises using the estimates from lexical retrieval to select a relatively small subset of the vocabulary as candidates for further analysis. Retrieval and prefiltering may also be applied to a set of sequences of speech elements, such as a set of phrases. Because it may be used as a fast means to evaluate and eliminate most of a large list of words, lexical retrieval and prefiltering is sometimes called "fast match" or "rapid match".

"Pass." A simple speech recognition system performs the search and evaluation process in one pass, usually proceeding generally from left to right, that is, from the beginning of the sentence to the end. A multi-pass recognition system performs multiple passes in which each pass includes a search and evaluation process similar to the complete recognition process of a one-pass recognition system. In a multi-pass recognition system, the second pass may, but is not required to be, performed backwards in time. In a multi-pass system, the results of earlier recognition passes may be used to supply look-ahead information for later passes.

Figure 1A:
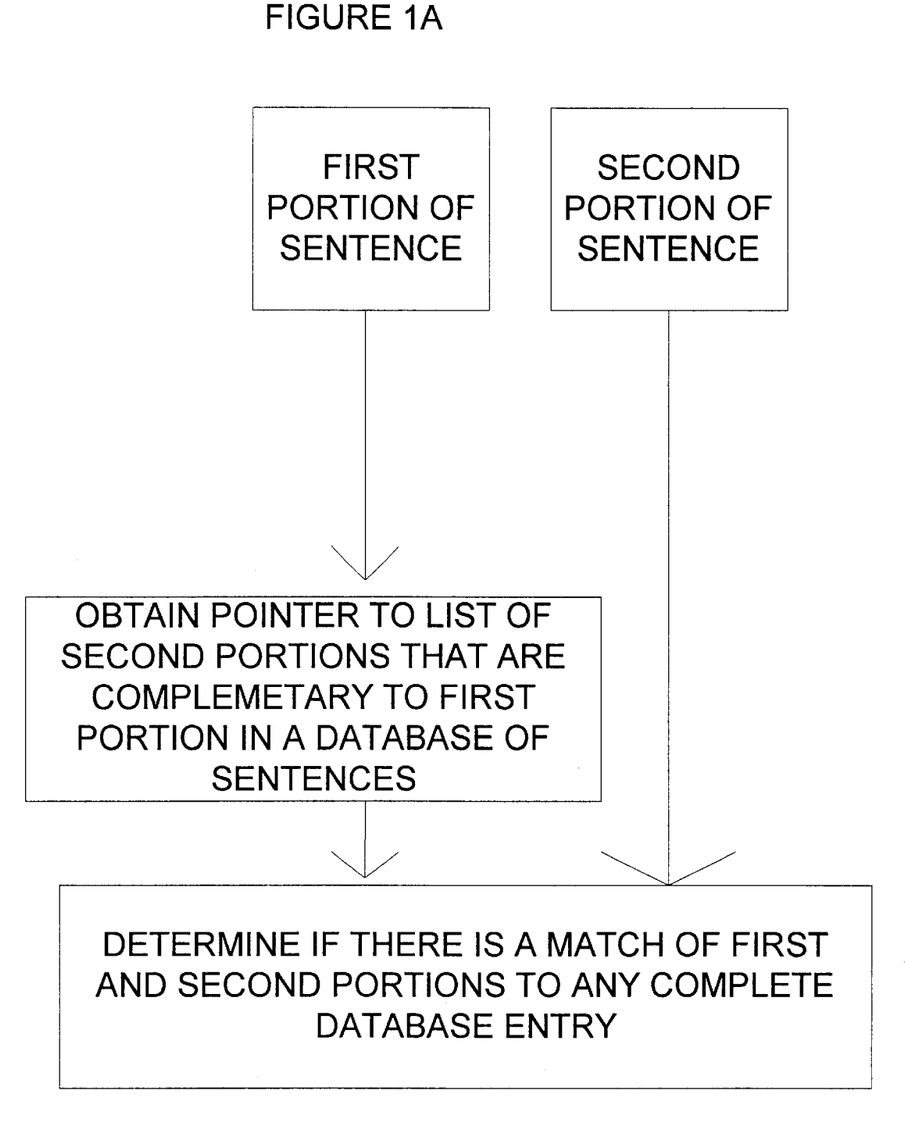
FIG. 1A is a flow chart describing a database consistency check process according to a first embodiment of the invention.

In a first embodiment of the invention as shown in FIG. 1A, a first portion of a sentence is received in step 154, and a second portion of the sentence is received in step 155. In step 157, the first portion of the sentence is used to obtain a pointer to a respective list of second portions of sentences that are complementary to the first portion of the sentence in a database of sentences. In step 159, it is determined whether or not there is a match of the first portion of the sentence and the second portion of the sentence based on information obtained from the list of second portions of sentences that are complementary to the first portion of the sentence.

Figure 1B:
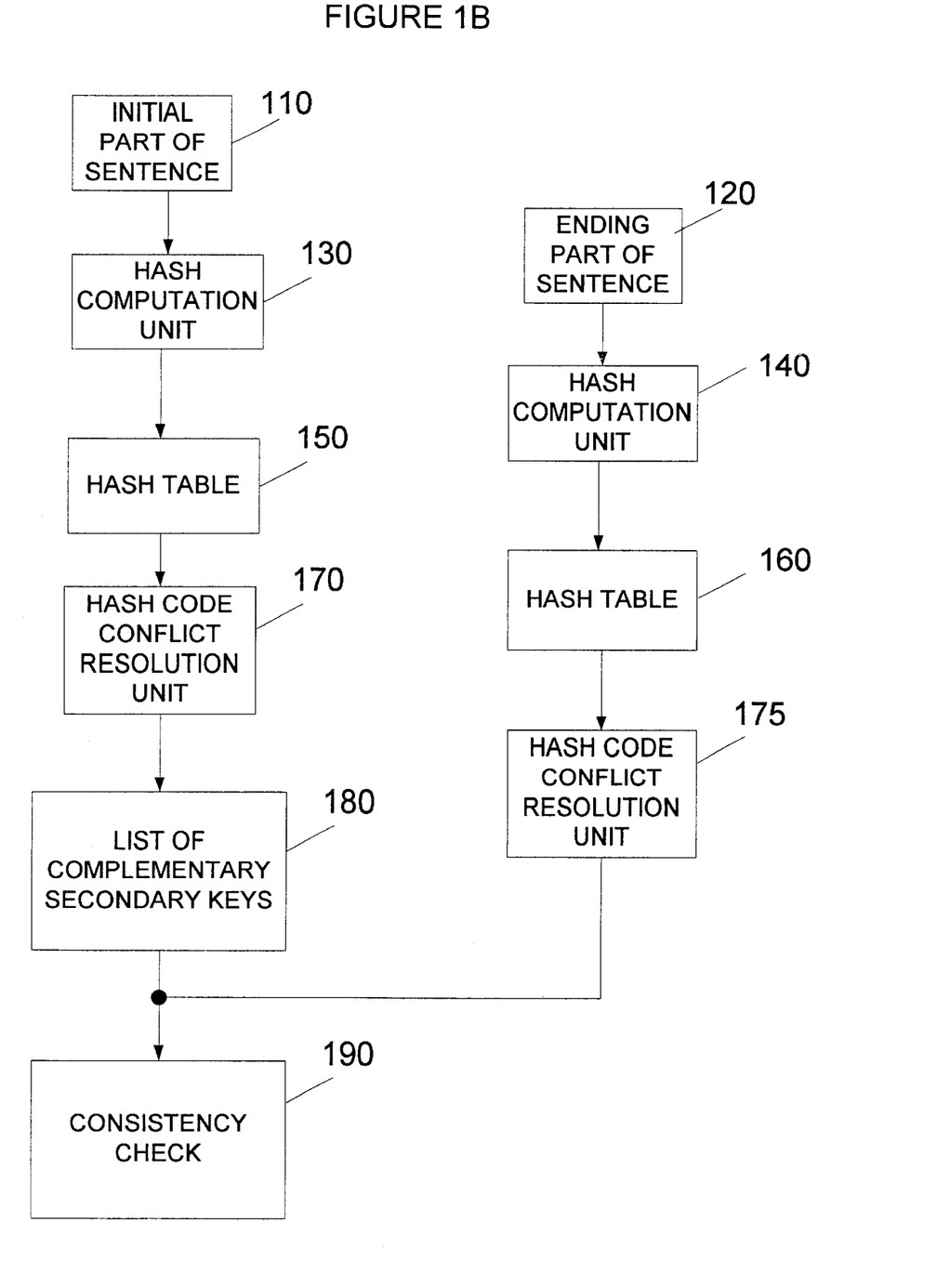
FIG. 1B is a system block diagram of a database consistency checker according to the first embodiment of the invention.

Referring now to FIG. 1B, elements making up the first embodiment of the invention will be described in detail below. A database consistency checker according to the first embodiment checks whether or not two pieces of data, when combined, make up a database entry. Those two pieces of data are shown in FIG. 1B as corresponding to an initial part of a sentence (first piece of data) 110, and an ending part of a sentence (second piece of data) 120. The way those two pieces of data are obtained prior to being input to the database consistency checker is not relevant to understanding the present invention as described herein.

By way of example and not by way of limitation, the first piece of data may be obtained by performing a speech recognition process on input speech in a first direction from a beginning point of the input speech to an approximate middle point, and the second piece of data may be obtained by performing a speech recognition process on the input speech in a second direction from an ending point of the input speech to the approximate middle point. As a further example, the first and second piece of data may be obtained by performing handwriting recognition on written input.

In one embodiment, the beginning portion of the sentence 110 is subject to a hash computation, as computed by hash computation unit 130 in FIG. 1B. Hash computations are well known in the art. For example, an 8-bit hash code for a an array of N bytes s[0], s[1], . . . , s[N–1] may be computed by the one line program $$\text{for } (x=0, n=0; n<N; n++) \; x=f[x \hat{\,} s[n]] \quad (1)$$

where the hash code is the final value of x,
the array f[ ] is a random permutation of the numbers from 0 to 255,
and the operator ^ is the bitwise exclusive or.

To compute a multi-byte hash code, the one-line program (1) can be used multiple times with different tables f[ ] of random permutations. For a hash code value in the range of from 0, . . . , M–1 for an arbitrary M less than $2^{32}$, compute a four-byte code and then take the residue modulo M.

A similar procedure can be performed in order to compute a hash value for the ending portion of the sentence 120, by way of the hash computation unit 140 shown in FIG. 1B. In different embodiments, methods other than hash computations may be used to find entries in tables 150 and 160. In one embodiment, for example, the tables 150 and 160 are sorted and the hash computation units 130 and 140 are replaced by binary tree searches.

FIG. 1B also shows a first hash table 150 that stores a plurality of hash values for a plurality of partial sentence beginning portions of each database entry. Also, a second hash table 160 stores a plurality of hash values for a plurality of partial sentence ending portions of each database entry.

By way of example and not by way of limitation, assume that the database to be checked for consistency comprises a plurality of entries, whereby each entry corresponds to: a) a first field of a person's city and state of residence, b) a second field corresponding to a person's first and last name, and c) a third field corresponding to a person's street number and street name of residence. For example, one database entry may be:

Boston Mass. Frank Smith 1011 Main Street

Now, assume that the initial part of the sentence 110 input to the database consistency checker 100 according to the first embodiment of the invention is:

Boston Mass.

Also, assume that the second part of the sentence 120 input to the database consistency checker according to the first embodiment of the invention is:

Frank Smythe 1011 Main Street

Now, also assume that there are no database entries that completely match the concatenated combination of the first and second parts of the sentence 110, 120. This may occur for any number of reasons, including an error by the speaker, an error in the speech recognition process that outputs the full sentence, an acoustic gap, etc. A speaker may have pronounced "Smith" using a British accent, thereby resulting in "Smythe" (long "i") being recognized by a speech recognizer, for example.

In order to determine whether or not the combined inputs to the database consistency checker match an entry in the database, and to do so in an expeditious manner, the present invention is provided to allow one to make such a determination. If the combined inputs do not completely match a database entry, then a "no match" determination will be made.

With respect to the example described above, the first hash table 150 might store the following hash values for the above database entry, whereby the hash values preferably have been computed beforehand:

1) A first hash value corresponding to the hash of the digital equivalent of "Boston".
2) A second hash value corresponding to the hash of the digital equivalent of "Boston Mass.".
3) A third hash value corresponding to the hash of the digital equivalent of "Boston Mass. Frank".
4) A fourth hash value corresponding to the hash of the digital equivalent of "Boston Mass. Frank Smith".
5) A fifth hash value corresponding to the bash of the digital equivalent of "Boston Mass. Frank Smith 1011".
6) A sixth hash value corresponding to the hash of the digital equivalent of "Boston Mass. Frank Smith 1011 Main".
7) A seventh hash value corresponding to the hash of the digital equivalent of "Boston Mass. Frank Smith 1011 Main Street".

In a similar manner, second hash table 140 might store at least the following hash values for the above database entry, whereby the hash values preferably have been computed beforehand:

1) A first hash value corresponding to the hash of the digital equivalent of "Street".
2) A second hash value corresponding to the hash of the digital equivalent of "Main Street".
3) A third hash value corresponding to the hash of the digital equivalent of "1011 Main Street".
4) A fourth hash value corresponding to the hash of the digital equivalent of "Smith 1011 Main Street".
5) A fifth hash value corresponding to the hash of the digital equivalent of "Frank Smith 1011 Main Street".
6) A sixth hash value corresponding to the hash of the digital equivalent "Mass. Frank Smith 1011 Main Street".
7) A seventh hash value corresponding to the hash of the digital equivalent of "Boston Mass. Frank Smith 1011 Main Street.

For a one hundred (100)-entry database, for the above example, there would be 700 separate hash values stored in the first hash table 150, and there would be 700 separate hash values stored in the second hash table 160.

Now, continuing with the above example, a first hash computation function 130 computes a hash value for the first portion of the sentence "Boston Mass." 110, and the second hash computation function 140 computes a hash value for the second portion of the sentence Frank Smythe 1011 Main Street" 120.

A first hash code conflict resolution unit 170 determines whether or not the computed hash value for the first portion of the sentence 110, as computed by the first hash computation unit 130, matches any entry in the first hash table 150. Similarly, a second hash code conflict resolution unit 175 determines whether or not the computed hash value for the second portion of the sentence 120, as computed by the second hash computation unit 140, matches any entry in the second hash table 160.

Now, if there, is a match or matches of the computed hash value for the first portion of the sentence 110 with one or more entries in the first hash table 150, the first hash code conflict resolution unit 170 is utilized to resolve any conflicts. Note that if the database is large, and due to the nature of a hash code computation process, there is a possibility that the hash code value computed for the first portion of the sentence 110 may match up with more than one entry in the first hash table 150, whereby at least one of those entries in the first hash table 150 corresponds to a different partial sentence word string than the first portion of the sentence 110. The second hash code conflict resolution unit 175 performs a similar function with respect to the second portion of the sentence 120.

The first hash code conflict resolution unit 170 checks a table containing a list of complementary secondary keys 180 for each entry in the first hash table 150. The list of complementary secondary keys 180 for a given entry in the first hash table 150 is, in essence, a list of allowable ending partial sentences.

If there are a plurality of complements for the initial portion of the sentence 110, as determined by the first hash code conflict resolution unit 170 based on the information provided from the list of complementary secondary keys 180, then the corresponding database entry or entries for each of those complementary secondary keys 180 are checked to determine if there is a precise word-for-word match to the ending portion of the sentence 120. This procedure is performed by the consistency checker 190 as shown in FIG. 1B. There should only be at most one precise match in the database for a concatenated combination of the initial portion of the sentence 110 and the ending portion of the sentence 120.

Now, returning back to the example described above, there will be a hit in the first hash table 150 for the hash value computed for "Boston Mass." that corresponds to the first portion of the sentence 110. However, since there is no exact match to any database entry for the ending portion of the sentence (since "Smythe" will result in a different hash computation than "Smith"), it is probably the case that no complementary secondary keys will exist in the database that have a hash code value that matches the hash code value computed for the ending portion of the sentence 120. However, it is possible that another ending sentence string does have a same hash code value as that corresponding to the ending portion of the sentence 120, and also that it is a complement to "Boston Mass.". Of course, this is a very unlikely occurrence, but the consistency checker 190 retrieves the actual database entry to perform a word-for-word match, whereby it would determine that there is not a match.

Now, assume that the example is slightly different in that the second portion of the sentence is:

Frank Smith 1011 Main Street

Then, in this case, there is at least one hash value match in the list of complementary secondary keys to the "Boston Mass." entry, and the consistency checker 190 would retrieve that database entry and confirm that the match was indeed a correct match.

The computation units shown in FIG. 1B, such as the first and second hash computation units 130, 140, and the first and second hash code resolution units 170, 175, may be performed by way of a computer processor that is programmed to perform the functions described above with respect to these units.

Figure 2:
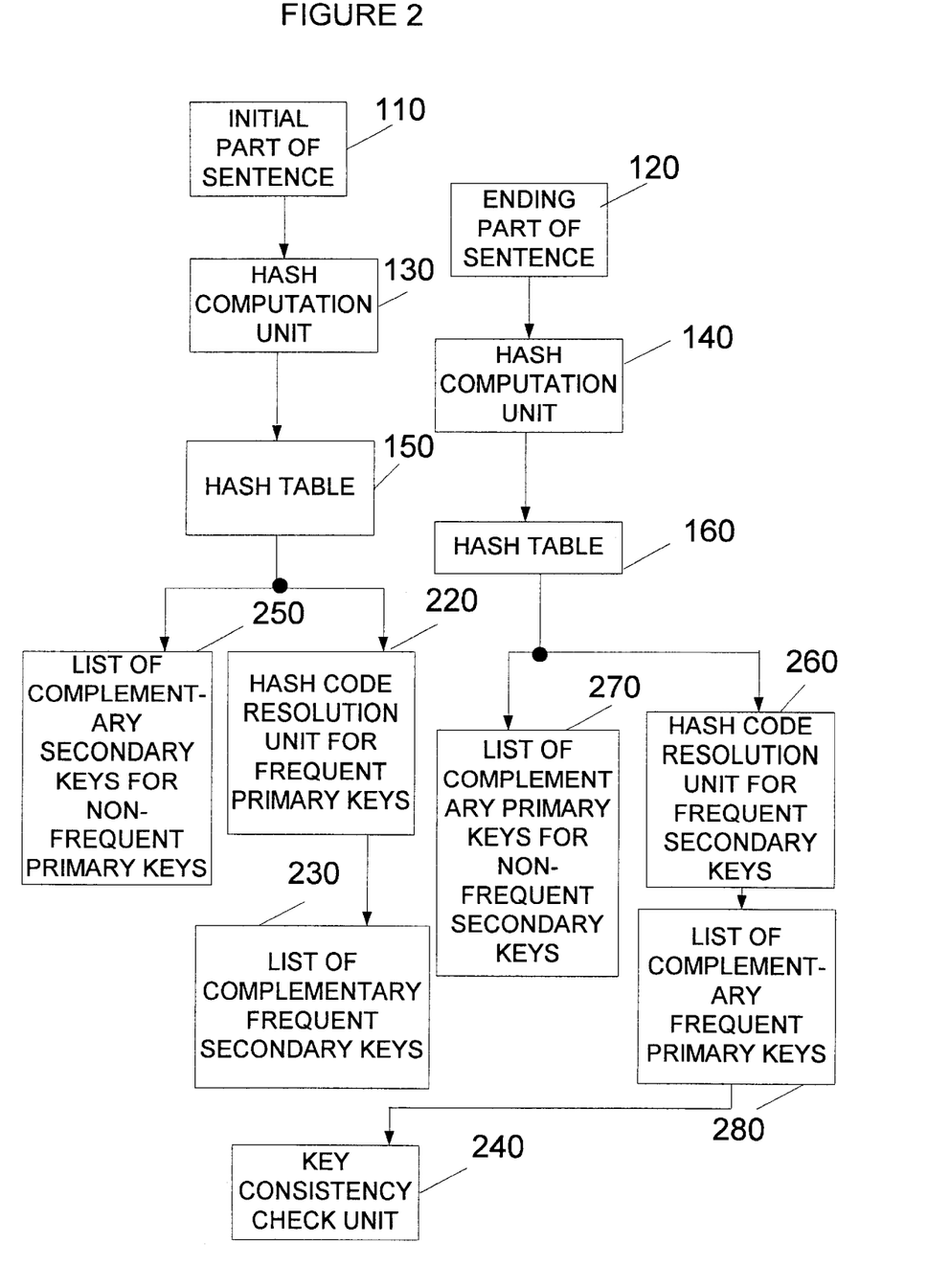
FIG. 2 is a system block diagram of a database consistency checker according to a second embodiment of the invention.

FIG. 2 shows a second embodiment of the invention, which is utilized in cases where the database is very large and can only be stored in an external disk or the like, and cannot be stored in its entirety in a smaller-sized internal Random Access Memory (RAM) of a Personal Computer (PC) or Workstation, for example. The elements 110, 120, 130, 140, 150 and 160 shown in FIG. 2 are similar to the same-numbered elements described above with respect to the first embodiment shown in FIG. 1B, and will not be described herein for the sake of brevity.

The second embodiment includes a list of complementary secondary, keys that correspond to all entries in the database that have the same initial sentence portion as was input as the initial sentence portion 110. Thus, in the example given above, if "Boston Mass." is the initial sentence portion 110, and if the database is a listing of all telephone numbers for persons residing in Mass., then the list of complementary secondary keys for "Boston Mass." will be extremely large. Accordingly, a hash code conflict resolution for frequent primary keys unit 220 is utilized to speed up the database consistency check process.

The hash code conflict resolution for frequent primary keys unit 220 obtains hash values of the frequent complementary secondary (or ending) portion word strings for the frequent, or most common, primary (or beginning) portion word strings, as stored in the list of complementary frequent secondary strings unit 230. If there is a hash value match as determined by the hash code conflict resolution for frequent primary keys unit 220, then that information is provided to a check keys for consistency unit 240, to determine whether or not a match actually exists in the database. In one implementation, this can be accomplished by a word-for-word match to the corresponding database entry br entries.

If the primary key is not a frequent key, then the hash value for the primary key is input to a list of complementary secondary keys for non-frequent primary keys unit 250, to determine if there is a match. For example, if the initial portion of the sentence 110 corresponded to "Braintree, Mass.", which is a very tiny town in Mass. in this hypothetical example, then there would be very few entries in the telephone database, and accordingly there would only be a small number of complementary secondary, or ending sentence portions, for database entries having a "Braintree, Mass." beginning or primary portion. In that case, it is a very simple matter to determine if there is a complementary match for the hash value computed for the non-frequent initial sentence portion 110 since the number of database entries to check is very small, and the match/no-match information is provided to the check keys for consistency unit 240.

A similar structure of elements is provided on the secondary sentence end, whereby there are provided a hash code conflict resolution for frequent secondary keys unit 260, a list of complementary primary keys for non-frequent secondary keys unit 270, and a list of complementary frequent primary keys unit 280.

With such a structure, only if a frequent primary key has a frequent secondary key complement, and vice versa, does a consistency check have to be performed in order to determine which database entry, if any, is a match for a combined concatenation of the initial portion of the sentence 110 and the ending portion of the sentence 120. More likely, there will be either a non-frequent beginning sentence portion or a non-frequent ending sentence portion, or both, which will allow a database consistency check using hash values in an accurate and expeditious manner.

The determination of whether a key is a frequent or non-frequent key is preferably made by determining whether or not the key appears in at least a predetermined number of different database entries (e.g., appears in at least 100 entries in a 10,000-entry database) in the database.

Figure 3:
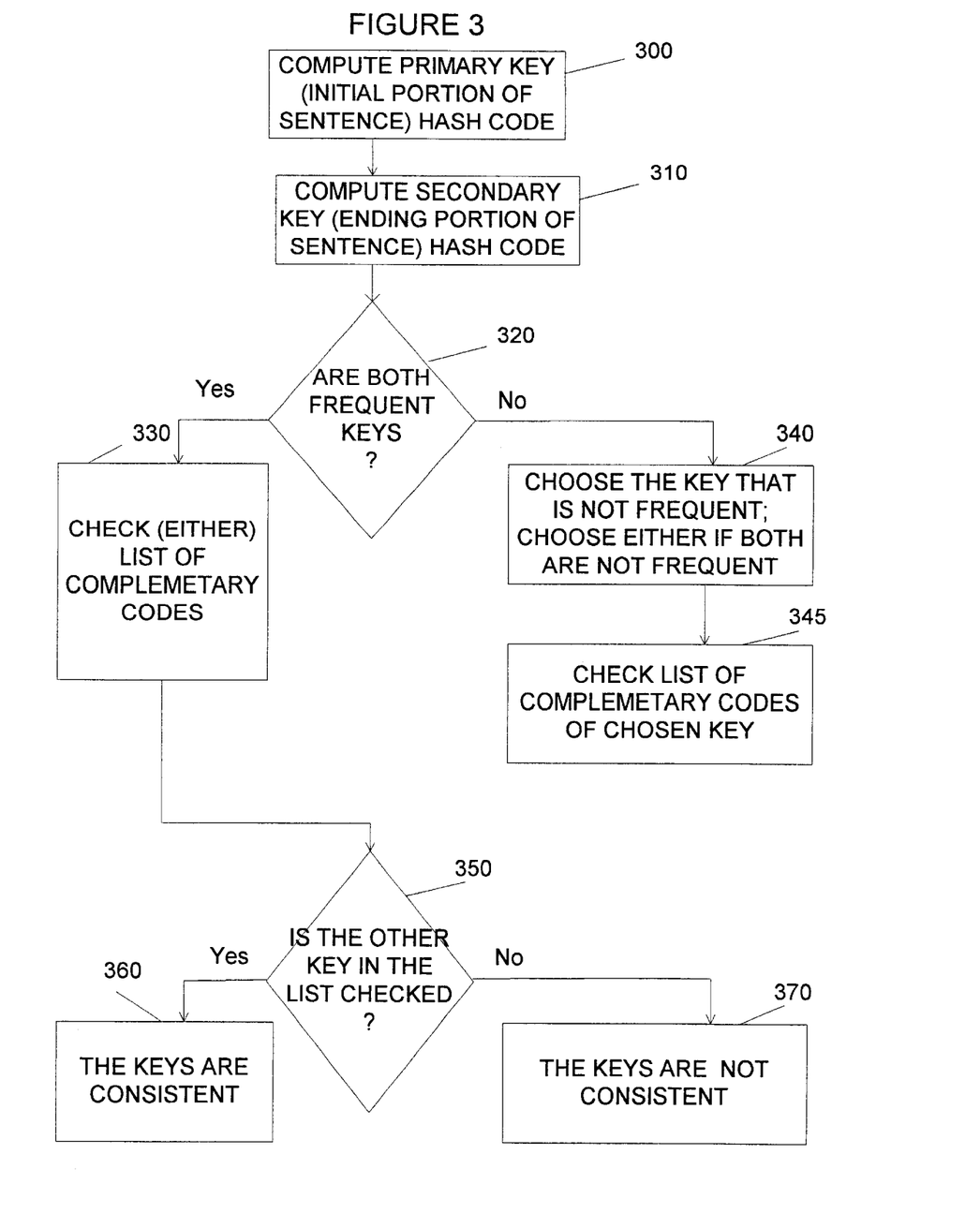
FIG. 3 is a flow chart describing a consistency check with mixed frequent and non-frequent keys, according to either the first or second embodiments of the invention.

FIG. 3 is a flow chart showing the various steps performed in a consistency check with mixed frequent and non-frequent keys. In a step 300, the primary key hash code (e.g., the hash code for the initial portion of the sentence 110) is computed. In a step 310, the secondary key hash code (e.g., the hash code for the ending portion of the sentence 120) is computed. In decision step 320, it is determined whether or not both of the keys are frequent. If both keys are frequent ('Yes' decision output from step 320), then either one of the two frequent keys is chosen, and a list of complementary codes of the chosen key is checked in a step 330. If either key is not frequent ('No' decision output from step 320), then the key is chosen that is not frequent, whereby either key is chosen if both keys are not frequent, as provided in a step 340, and there is a check with respect to a list of complementary codes of the chosen key, as provided in step 345.

In either case, the database consistency check process proceeds to a determination step 350, whereby it is determined whether or not the other (non-chosen) key is in the list checked. If the determination results in a 'Yes', the keys are determined to be consistent (e.g., there is a database entry with both keys in it), as shown in a step 360. Alternatively, if the determination results in a 'No', the keys are determined to not be consistent (e.g., there is no database entry with both keys in it), as shown in a step 370.

A third embodiment of the invention will now be described below. The third embodiment provides error correction by utilizing hash codes with gaps, utilizing many of the features of either the first or second embodiments described previously.

As one example, the third embodiment provides for error correction to correct errors in a speech recognition process in which the user is supposed to speak an utterance from a (possibly very large) pre-compiled list of allowed utterances. Not only can the third embodiment correct mistakes made by the speech recognition system, but it can also correct errors in which the user substitutes a different word for one or more words of the intended utterance. It can also correct errors that arise because the database of listed utterances contains mistakes.

As a further example, the third embodiment may be used to correct errors in the database or errors by the user even when the data is obtained not by speech recognition but by a relatively error free process such as typing.

The present invention according to the third embodiment assumes that a speech recognizer has already been run in two passes over the utterance to be recognized. For example, there was performed one forward pass recognizing from the beginning of the utterance to the end, and one backward pass going from the end of the utterance back to the beginning, and that the results of these two passes have been obtained by the system. Alternatively, two forward passes may be made, whereby a first pass is made with a "loose" grammar, and whereby a second pass is made with a "stronger" grammar. For each of these two passes, the speech recognizer can use conventional speech recognition techniques, well-known to those skilled in the art.

The present invention according to the third embodiment operates by discovering a consistent pair of partial sentence hypotheses. One hypothesis is for a partial sentence beginning at the beginning of the utterance and continuing up to some point in the middle of the utterance. The other hypothesis is for a partial sentence going backward from the end of the utterance to a variable beginning point in the middle of the utterance. There is a gap between the ending point for the partial hypothesis from the beginning of the sentence and the variable beginning point for the partial hypothesis from the end of the sentence. The gap allows the two partial sentence hypotheses to be combined into a single hypothesis that skips over the error.

The two partial sentence hypothesis are matched up by pre-compiling a table of hash codes, in a manner described above with respect to the first and second embodiments. For each word position in each utterance in the pre-compiled list of allowed utterances, a hash code is computed for each of the two parts of the sentence (a first sentence part being everything in the sentence before the given word position, and the second sentence part being everything in the sentence after the given word position). The hash code for the beginning of the sentence up to a given word position is called a left hash code. The hash code for the end of the sentence that occurs after the given word position is called a right hash code. Pairs of corresponding hash codes are stored in a table of hash codes pairs. For correcting single word errors, a left and right hash code form a corresponding pair if they are hash codes from the same entry in the utterance list with a one-word gap between their word positions. A similar technique may be used with no gap as a search accelerator technique, with no error correction ability, as described above with respect to the first and second embodiments. If desired, a larger gap can be used between corresponding left and right hash codes. For example, in a database application, the gap might be an entire data field in the database entry, whereby the field may include a city and state, for example.

In the third embodiment, similar to the description provided above the first and second embodiments, for each left hash code, a list is kept for all the right hash codes that are part of a corresponding pair (but with a word gap) with the given left hash code, for some entry in the list of allowed utterances. A similar list is kept of the corresponding left hash codes for each right hash code.

For a left or right hash code that occurs in very many entries in the list allowed utterances, the list of complementary codes may be too large. A threshold is set for the size of the complementary list. Any left or right hash code for which the complementary list size is greater than the size threshold will be called a "frequent" code. For any frequent code, only the list of complementary frequent codes will be kept. This feature is similar to that described above with respect to the second embodiment.

To determine if a particular pair of hash codes form a complementary pair, the following process is performed. If either the left hash code or the right hash code is not a frequent code, then check its list of complementary codes (if neither is frequent, then check the list which is shorter). Then the two codes are a complementary pair if and only if the second code is in the list of complementary codes for the first.

If both codes are frequent codes, then check the shorter list of complementary frequent codes. The two codes are a complementary pair if and only if the second code is in the list of complementary frequent codes for the first.

Two different word strings may map to the same hash code. A particular pair of word strings may be regarded as complementary merely because they share the same hash codes with a complementary pair in which one or both of the word strings are different from the word strings in the particular pair. The ambiguity is resolved when the hypothesized sentence is checked against the list of allowed utterances. However, if the full list is too large to, fit in memory, that check will require a disk access, which may be relatively time consuming.

In a preferred implementation of the third embodiment, the actual word strings for the "frequent" left and right hash codes are stored in memory (they are frequent because they occur in many different utterances, but they are relatively few in number). A pointer or index to the actual word string is stored in the list of complementary pairs for such a frequent hash code. This prevents any infrequent word string which maps to the same hash code as a frequent word string from being matched up with the complementary parts of the frequent word string.

Provided below in Table A is pseudo-code for implementing the third embodiment for an optional gap of length one.

Table A-Pseudo-code

Case1:List of Allowed Utterances Fits in RAM
Precompute complementary forward and backward word sequences
For all allowed utterances
    for all word positions in utterance U=<H1,w,H2>
        Put H1 into list of complementary forward sequences indexed by H2
Perform forward recognition pass
    Save forward scores alpha(H,t) indexed by word sequence H and time t
    Accumulate BestAlpha(H,t)=Max(alpha(H,t−1),alpha(H,t))
Perform backward recognition pass backwards for all t
    for all active hypotheses H2
        for all H1 in list of complementary sequences to H2
            gamma Skip(H2,H1)=beta(H2,t)+BestAlpha(H,t)
            Put H1,w,H2>on n-best list
Sort n-best list using score leaving out skipped word w
Case2: Hash Table in RAM, List of Allowed Utterances on Disk (and not in RAM)
for all hypotheses H
    count the number of allowed utterances in which H occurs
    if the count is greater than frequency threshold, set Freq(H)=TRUE
For all allowed utterances
    for all word positions in Utterance U=<H1,w,H2>
        if (Freq(H2)=false) {
            Put H1 in list indexed by H2
            Put hash(H1) in list indexed by hash (H2) and load in RAM
        }else {
            if (Freq(H2)=TRUE) {
                Put H2 in list indexed by H1 and load in RAM
            }
        }
    if (Freq(H1)#false) {
        Put H2 in list indexed by H1
        Put hash(H2) in list indexed by hash(H1) and load in RAM
    }else {
        if (Freq(H1)=TRUE) {
            Put H1 in list indexed by H2 and load in RAM
        }
    }
Perform forward recognition pass
    Save forward scores alpha(H,t) indexed by word sequence H and time t Accumulate BestAlpha(H,t)=Max(alpha(H,t−1),alpha(H,t))
Perform backward recognition pass backwards for all t
  for all active hypotheses H2
    if (H1 complementary to H2 (or complementary hash codes))
      gammaSkip(H2,H1)=beta(H2,t)+BestAlpha(H,t)
      Put <H1,w,H2> on n-best list
Sort n-best list using score leaving out skipped word w It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings-or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed:

1. A word sequence recognition method, comprising:
   receiving a first portion of a sentence;
   receiving a second portion of the sentence;
   using the first portion of the sentence to obtain a pointer to a respective list of second portions of sentences that are complementary to the first portion of the sentence in a database of sentences; and
   determining whether there is a match of the first portion of the sentence and the second portion of the sentence based on information obtained from the list of second portions of sentences that are complementary to the first portion of the sentence.

2. The method as defined in claim 1, wherein each of the first and second portions of the sentence correspond to a sequence of words.

3. The method as defined in claim 1, wherein the using the first portion of the sentence to obtain a pointer step comprises determining an entry in a table associated with the first portion of the sentence, wherein each of a plurality of entries in the table contains a respective list of second portions of sentences that are complementary to the first portion of the sentence.

4. The method as defined in claim 3, wherein the table is a binary tree.

5. The method as defined in claim 3, wherein the table is a hash table.

6. The method as defined in claim 1, wherein the list of second portions correspond to respective entries in the database of sentences that are missing one word that occurs after an end of the first portion.

7. The method as defined in claim 1, wherein the method is used to correct an error in the one word due to a speaker speaking an incorrect sentence.

8. The method as defined in claim 1, wherein the method is used to correct an error in the database for a sentence whereby the one word in the sentence is the error.

9. The method as defined in claim 1, wherein the method is utilized for speech recognition.

10. The method as defined in claim 1, wherein the method is utilized for handwriting recognition.

11. The method as defined in claim 1, wherein the method is utilized for optical character recognition.

12. A word sequence recognition method, comprising:
    receiving a first portion of a sentence;
    receiving a second portion of the sentence;
    determining an entry in at least one of a first table associated with the first portion that is recognized of the sentence, or a second table that is associated with the second portion that is recognized of the sentence;
    selecting either the first table or the second table based on the entry,
    determining, based on the entry in the selected table, a list of second portions of sentences that are complementary to the first portion that is recognized of the sentence; and
    determining a match to one of the second portions in the list of second portions that are complementary based on information regarding the second portion.

13. The method as defined in claim 12, wherein at least one of the tables is a hash table.

14. The method as defined in claim 12, wherein at least one of the tables is a binary tree.

15. The method as defined in claim 12, further comprising:
    if one of the tables associated a portion of a sentence does not have an entry determined therefor, then determining an entry associated with that portion that is recognized of the sentence; and wherein
    the selecting step comprises determining if the entries are both frequent portions of a sentence;
    if both entries are frequent portions of a sentence, then selecting one of the entries and obtaining from the table associated with that entry a list of portions of sentences that are complementary thereto;
    if both entries are not frequent portions of a sentence, then selecting one of the entries that is not frequent and obtaining a list of sentences that are complementary thereto; and
    determining a match to one of the portions of sentences in the list that are complementary to the entry based on information regarding the portion that is recognized of the sentence that is no associated with the selected entry.

16. The method as defined in claim 12, wherein the list of second portions of sentences correspond to respective entries in the database of sentences that are missing one word that occurs after an end of the first portion of sentence.

17. The method as defined in claim 16, wherein the method is used to correct an error in the one word due to a speaker speaking an incorrect sentence.

18. The method as defined in claim 16, wherein the method is used to correct an error in the database for a sentence whereby the one word in the sentence is the error.

19. The method as defined in claim 12, wherein the method is utilized for speech recognition.

20. The method as defined in claim 12, wherein the method is utilized for handwriting recognition.

21. The method as defined in claim 12, wherein the method is utilized for optical character recognition.

22. A word sequence recognition system for comparing an input sentence against a plurality of sentences stored in a database, comprising:

a first input unit for inputting a first portion of the input sentence;

a second input unit for inputting a second portion of the input sentence;

a first hash computation unit for determining a first hash value corresponding to the first portion of the input sentence;

a second hash computation unit for determining a second hash value corresponding to the second portion of the input sentence; and a hash code conflict resolution unit for comparing the second hash value against a list of hash values corresponding to complementary second portions of the sentence that occur together with the first portion of the sentence in at least one entry in the database, and for outputting a database consistency signal when at least one match is found.

23. The system defined in claim 22, wherein the list of hash values corresponding to the complementary second portions of sentences correspond to respective entries in the database of sentences that are missing one word that occurs after an end of the first portion of sentence.

24. The system as defined in claim 23, wherein the system is used to correct an error in the one word due to a speaker speaking an incorrect sentence.

25. The system as defined in claim 23, wherein the system is used to correct an error in the database for a sentence whereby the one word in the sentence is the error.

26. The system as defined in claim 22, wherein the system is utilized for speech recognition.

27. The system as defined in claim 22, wherein the system is utilized for handwriting recognition.

28. The system as defined in claim 22, wherein the system is utilized for optical character recognition.

29. The system as defined in claim 22, further comprising:

a first hash table for storing the list of hash values corresponding to complementary second portions of the sentence that occur together with the first portion of the sentence in at least one entry in the database.

30. The system as defined in claim 29, further comprising:

a second hash table for storing a, list of hash values corresponding to complementary first portions of the sentence that occur together with the second portion of the sentence in at least one entry in the database.

31. A program product having machine-readable program code recorded thereon for performing word sequence recognition of a first portion of a sentence and a second portion of the sentence with a database of allowable sentences, when executed by a machine, causing the machine to perform the following method steps:

utilizing the first portion of the sentence to obtain a pointer to a respective list of second portions of sentences that are complementary to the first portion of the sentence in a database of sentences; and determining whether there is a match of the first portion of the sentence and the second portion of the sentence based on information obtained from the list of second portions of sentences that are complementary to the first portion of the sentence.

32. The program product as defined in claim 31, wherein each of the first and second portions of the sentence, correspond to a sequence of words.

33. The program product as defined in claim 31, further comprising:

determining an entry in a table associated with the first portion of the sentence, wherein each of a plurality of entries in the table contains a respective list of second portions of sentences that are complementary to the first portion of the sentence.

34. The program product as defined in claim 33, wherein the table is a binary tree.

35. The program product as defined in claim 33, wherein the table is a hash table.

36. The program product as defined in claim 31, wherein the list of second portions correspond to respective entries in the database of sentences that are missing one word that occurs after an end of the first portion.

* * * * *